US012749248B2

(12) United States Patent
Yuan et al.

(10) Patent No.: US 12,749,248 B2
(45) Date of Patent: Sep. 29, 2026

(54) PHYSICS-GUIDED MOTION DIFFUSION MODEL

(71) Applicant: NVIDIA Corporation, Santa Clara, CA (US)

(72) Inventors: Ye Yuan, Santa Clara, CA (US); Jiaming Song, San Carlos, CA (US); Umar Iqbal, San Jose, CA (US); Arash Vahdat, Mountain View, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 264 days.

(21) Appl. No.: 18/317,378

(22) Filed: May 15, 2023

(65) Prior Publication Data

US 2024/0169636 A1 May 23, 2024

Related U.S. Application Data

(60) Provisional application No. 63/425,258, filed on Nov. 14, 2022.

(51) Int. Cl.

| | |
|---|---|
| ***G06T 13/40*** | (2011.01) |
| ***G06T 5/70*** | (2024.01) |
| ***G06T 13/80*** | (2011.01) |

(52) U.S. Cl.

CPC ................ *G06T 13/40* (2013.01); *G06T 5/70* (2024.01); *G06T 13/80* (2013.01); *G06T 2207/20081* (2013.01); *G06T 2207/20084* (2013.01)

(58) Field of Classification Search

CPC ...................... G06T 13/40; G06T 2207/20081

See application file for complete search history.

(56) References Cited

U.S. PATENT DOCUMENTS

| | | | | |
|---|---|---|---|---|
| 9,681,814 | B2 * | 6/2017 | Galloway | A61B 5/25 |
| 10,546,408 | B2 * | 1/2020 | Yang | G06N 3/045 |
| 2021/0319312 | A1 * | 10/2021 | Malaya | G06F 17/17 |

OTHER PUBLICATIONS

Findlay et al. (Findlay, E. J. C., Zhang, H., Chang, Z., and Shum, H. P. H., "Denoising Diffusion Probabilistic Models for Styled Walking Synthesis," arXiv:2209.14828v1 [cs.CV], published Sep. 29, 2022, 2 pages). (Year: 2022).*

(Continued)

*Primary Examiner* — Xiao M Wu
*Assistant Examiner* — Ahmed Taha
(74) *Attorney, Agent, or Firm* — Leydig, Voit & Mayer, Ltd.

(57) ABSTRACT

Systems and methods are disclosed that improve performance of synthesized motion generated by a diffusion neural network model. A physics-guided motion diffusion model incorporates physical constraints into the diffusion process to model the complex dynamics induced by forces and contact. Specifically, a physics-based motion projection module uses motion imitation in a physics simulator to project the denoised motion of a diffusion step to a physically plausible motion. The projected motion is further used in the next diffusion iteration to guide the denoising diffusion process. The use of physical constraints in the physics-guided motion diffusion model iteratively pulls the motion toward a physically-plausible space, reducing artifacts such as floating, foot sliding, and ground penetration.

20 Claims, 11 Drawing Sheets

(56) References Cited

OTHER PUBLICATIONS

Shimada et al. (S. Shimada, V. Golyanik, W. Xu, and C. Theobalt, "PhysCap: Physically Plausible Monocular 3D Motion Capture in Real Time," arXiv: 2008.08880 [cs.CV], published Nov. 27, 2020, 16 pages). (Year: 2020).*

Kim et al. (T. Kim , H. Lee , and W. Lee, "Physics Embedded Neural Network Vehicle Model and Applications in Risk-Aware Autonomous Driving Using Latent Features" arXiv: 2207.07920v1 [cs. CV], published Jul. 16, 2022, 8 pages). (Year: 2022).*

Shimada et al. (S. Shimada, V. Golyanik, W. Xu, and C. Theobalt, âPhysCap: Physically Plausible Monocular 3D Motion Capture in Real Time, â arXiv: 2008.08880 [cs.CV], published Nov. 27, 2020, 16 pages) (Year: 2020).*

Ahuja, C., et al., "Language2pose: Natural language grounded pose forecasting," In 2019 International Conference on 3D Vision (3DV), pp. 719-728, IEEE, 2019.

Bhattacharya, U., et al., "Text2gestures: A transformer-based network for generating emotive body gestures for virtual agents," In 2021 IEEE Virtual Reality and 3D User Interfaces (VR), pp. 1-10, IEEE, 2021.

Cervantes, P., et al., "Implicit neural representations for variable length human motion generation," In Proceedings of the European Conference on Computer Vision (ECCV), pp. 356-372, Springer, 2022.

Guo, C., et al., "Generating diverse and natural 3d human motions from text," In Proceedings of the IEEE/CVF Conference on Computer Vision and Pattern Recognition, pp. 5152-5161, 2022.

Guo, C., et al., "Action2motion: Conditioned generation of 3d human motions," In Proceedings of the 28th ACM International Conference on Multimedia, pp. 2021-2029, 2020.

Ho, J., et al., "Denoising diffusion probabilistic models," In Advances in Neural Information Processing Systems, 2020.

Ho, J., et al., "Classifier-free diffusion guidance," In NeurIPS 2021 Workshop and Deep Generative Models and Downstream Applications, 2021.

Nahmood, N., et al., "Amass: Archive of motion capture as surface shapes," In Proceedings of the IEEE/CVF International Conference on Computer Vision, pp. 5442-5451, 2019.

Makoviychuk, V., et al., "Isaac gym: High performance gpu based physics simulation for robot learning," In Thirty-Fifth Conference on Neural Information Processing Systems Datasets and Benchmarks Track, 2021.

Peng, X.B., et al., "DeepMimic: Example-guided deep reinforcement learning of physics-based character skills," ACM Transactions on Graphics (TOG), 37(4):1-14, 2018.

Petrovich, M., et al., "Action-conditioned 3d human motion synthesis with transformer VAE," In Proceedings of the IEEE/CVF International Conference on Computer Vision, pp. 10985-10995, 2021.

Sohl-Dickstein, J., et al., "Deep unsupervised learning using nonequilibrium thermodynamics," In International Conference on Machine Learning, 2015.

Song, J., et al., "Denoising diffusion implicit models," In International Conference on Learning Representations, 2021.

Tevet, G., et al., "Human motion diffusion model," arXiv preprint arXiv:2209.14916, 2022.

Yuan, Y., et al., "Residual force control for agile human behavior imitation and extended motion synthesis," In Advances in Neural Information Processing Systems, 2020.

* cited by examiner

Synthesized Motion 100

Synthesized Motion 120

PHYSICS-GUIDED MOTION DIFFUSION MODEL

CLAIM OF PRIORITY

This application claims the benefit of U.S. Provisional Application No. 63/425,258 titled "Physics-Guided Human Motion Diffusion Model," filed Nov. 14, 2022, the entire contents of which is incorporated herein by reference.

BACKGROUND

Human motion generation is an important task with numerous applications in animation, gaming, and virtual reality. Conventional motion synthesis techniques rely on a denoising diffusion (generative neural network) model to synthesize motion defined by a text or action. The synthesized motion is then applied to a human SMPL model (parameterized mesh). Even though diffusion models have a superior ability to model the distribution of human motion, the diffusion models have no explicit mechanisms to enforce physical constraints or model the complex dynamics induced by forces and contact. Consequently, the diffusion models largely disregard the laws of physics in the diffusion process and often generate physically implausible motions with pronounced artifacts such as floating, foot sliding, and ground penetration. The artifacts seriously impact the quality of generated motions and limits the use of generated human motion for real-world applications such as animation and virtual reality, where human viewers are highly sensitive to the slightest clue of physical inaccuracy. There is a need for addressing these issues and/or other issues associated with the prior art.

SUMMARY

Embodiments of the present disclosure relate to synthesizing physics-guided motion. Systems and methods are disclosed that improve performance of synthesized motion generated by a diffusion neural network model. In contrast to conventional systems, such as those described above, the physics-guided motion diffusion model incorporates physical constraints into the diffusion process to model the complex dynamics induced by forces and contact. Specifically, a physics-based motion projection module uses motion imitation in a physics simulator to project the denoised motion of a diffusion step to a physically plausible motion. The projected motion is further used in the next diffusion iteration to guide the denoising diffusion process. The use of physical constraints in the physics-guided motion diffusion model iteratively pulls the motion toward a physically plausible space, reducing artifacts such as floating, foot sliding, and ground penetration.

In an embodiment, the method includes processing, by a diffusion neural network model, an input motion definition and noisy motion data to produce synthesized motion data for a character and applying learned parameters, by a physics-based motion neural network model, to adapt the synthesized motion data to physical constraints of an environment on the character, producing physics-guided motion data specific to the character, where the physics-guided motion data corresponds to the input motion definition.

BRIEF DESCRIPTION OF THE DRAWINGS

The present systems and methods for a physics-guided motion diffusion model are described in detail below with reference to the attached drawing figures, wherein.

DETAILED DESCRIPTION

Systems and methods are disclosed related to physics-guided motion diffusion. A physics-guided motion diffusion model incorporates physical constraints into the diffusion process to model the complex dynamics induced by forces and contact. In contrast with conventional systems, incorporating the physical constraints into the diffusion process models the complex dynamics induced by forces and contact, reducing artifacts such as floating, foot sliding, and ground penetration.

Denoising diffusion models are a class of generative models that are especially suited for a motion synthesis task due to their strong ability to model complex distributions, which has been demonstrated extensively in the image generation domain. Conventional motion synthesis techniques rely on a denoising diffusion (generative neural network) model to synthesize motion defined by a text or action. The synthesized motion is then applied to a human SMPL model (parameterized mesh). The denoising diffusion model may be trained to capture the multi-modal distribution of human motions which can be highly complex due to the high variety of human motions and the intricate interaction between human body parts. However, the synthesized motion generated using conventional motion synthesis techniques often include artifacts such as floating, foot sliding, and ground penetration. Such artifacts limit the use of synthesized motion for real-world applications such as animation and virtual reality.

Figure 1A:
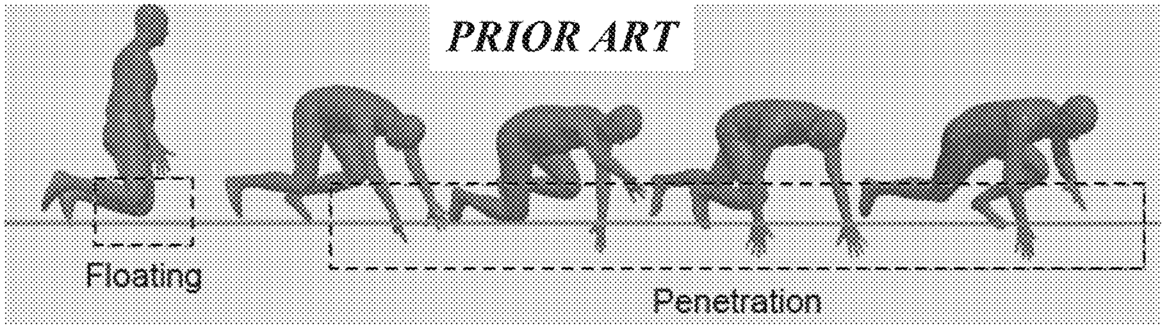
FIG. 1A illustrates synthesized motion generated by a prior art diffusion model and synthesized physics-guided motion generated by a physics-guided motion diffusion model, in accordance with an embodiment.
Figure 1A:
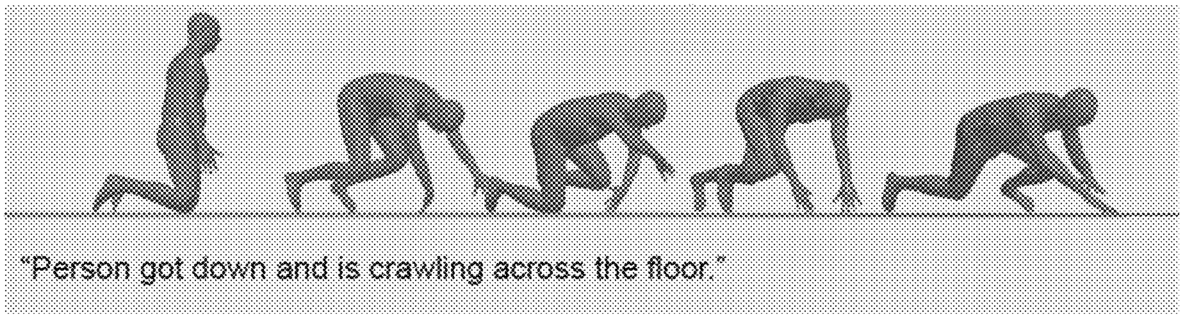

FIG. 1A illustrates synthesized motion 100 generated by a prior art diffusion model and synthesized motion 120 generated by a physics-guided motion diffusion model, in accordance with an embodiment. The synthesized motions 100 and 120 are generated by a prior art diffusion model and the physics-guided motion diffusion model, respectively, in response to the defined text or action "person got down and is crawling across the floor." Artifacts including floating and ground plane penetration are visible in the synthesized motion 100 for the human. In particular, the humans' knees are floating above the ground plane and the humans' hands penetrate the ground plane. Even though the prior art diffusion model has the ability to model the distribution of human motion, the prior art diffusion model has no explicit mechanisms to enforce physical constraints or model the complex dynamics induced by forces and contact.

In contrast, the synthesized motion 120 for the human does not exhibit the floating and ground plane penetration artifacts and is physically plausible. The physics-guided motion diffusion model integrates the laws of physics into the denoising diffusion process to synthesize the physically plausible motion. The physics-guided motion diffusion model leverages a physics-based motion neural network model that projects an input motion to a physically plausible space. During the diffusion process, the physics-based motion neural network model projects denoised motion generated by a diffusion model processing iteration (step) into a physically plausible motion.

In an embodiment, the physics-based motion neural network model serves the vital role of enforcing physical constraints in the physics-guided motion diffusion model, which is achieved by motion imitation in a physics simulator. Specifically, using large-scale motion capture data, a motion imitation policy is trained that can control a character agent (e.g., human, animal, object, etc.) in the physics simulator to mimic a vast range of input motions. The resulting simulated motion enforces physical constraints and removes or reduces artifacts such as floating, foot sliding, and ground penetration. Once trained, the motion imitation policy can be used to mimic the denoised motion of a diffusion iteration to output a physically plausible motion.

Figure 1B:
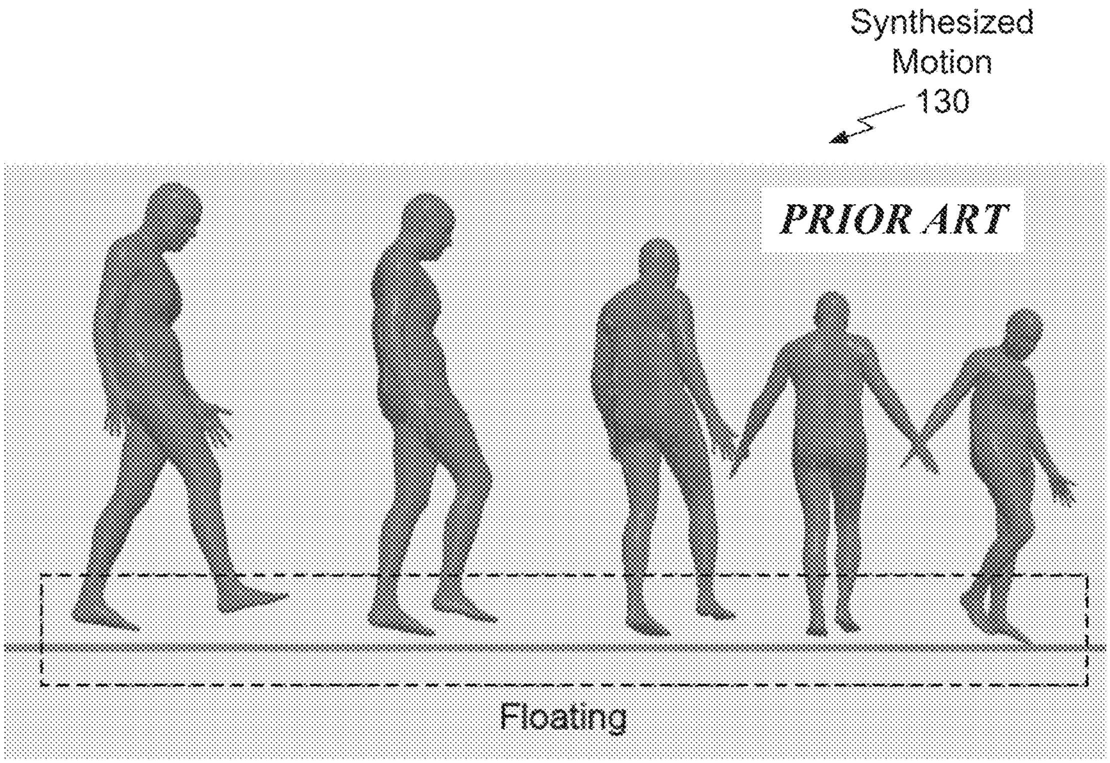
FIG. 1B illustrates synthesized motion generated by a prior art diffusion model and synthesized physics-guided motion generated by a physics-guided motion diffusion model, in accordance with an embodiment.
Figure 1B:
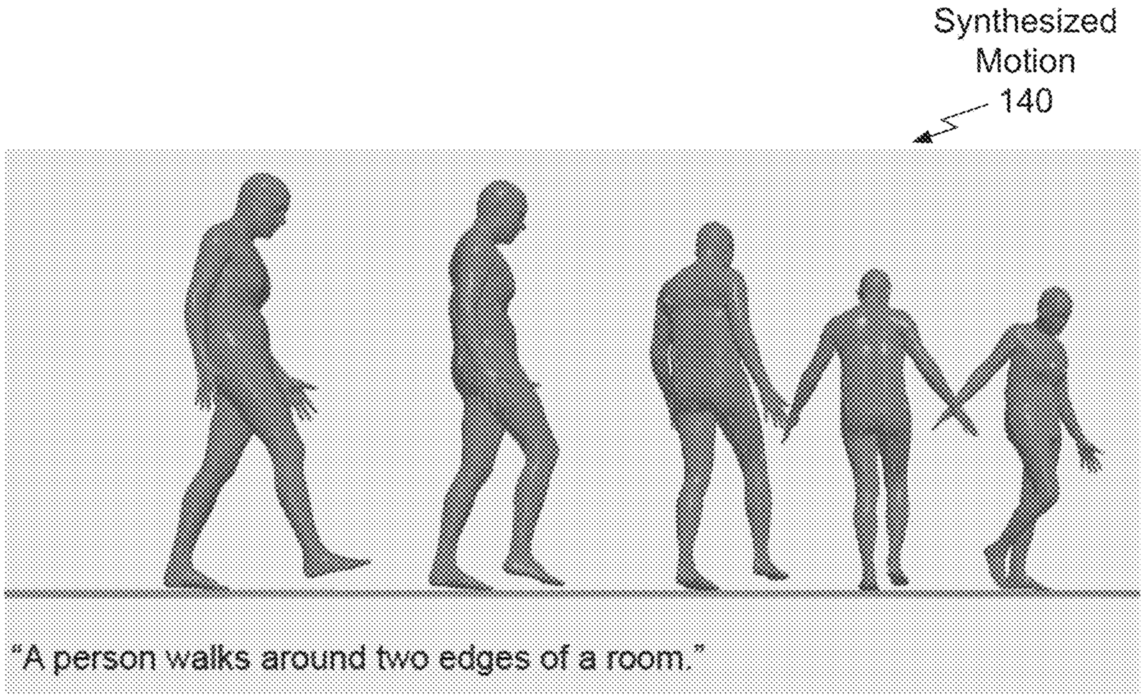

FIG. 1B illustrates synthesized motion 130 generated by a prior art diffusion model and synthesized motion 140 generated by a physics-guided motion diffusion model, in accordance with an embodiment. The synthesized motions 100 and 120 are generated by a prior art diffusion model and the physics-guided motion diffusion model, respectively, in response to the defined text or action "a person walks around two edges of a room." A floating artifact is visible in the synthesized motion 130 for the human. In particular, both of the humans' feet are floating above the ground plane. In contrast, the synthesized motion 140 for the human does not exhibit the floating artifacts. Specifically, at least one foot is in contact with the ground plane while the other foot is lifted in a walking posture.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2A:
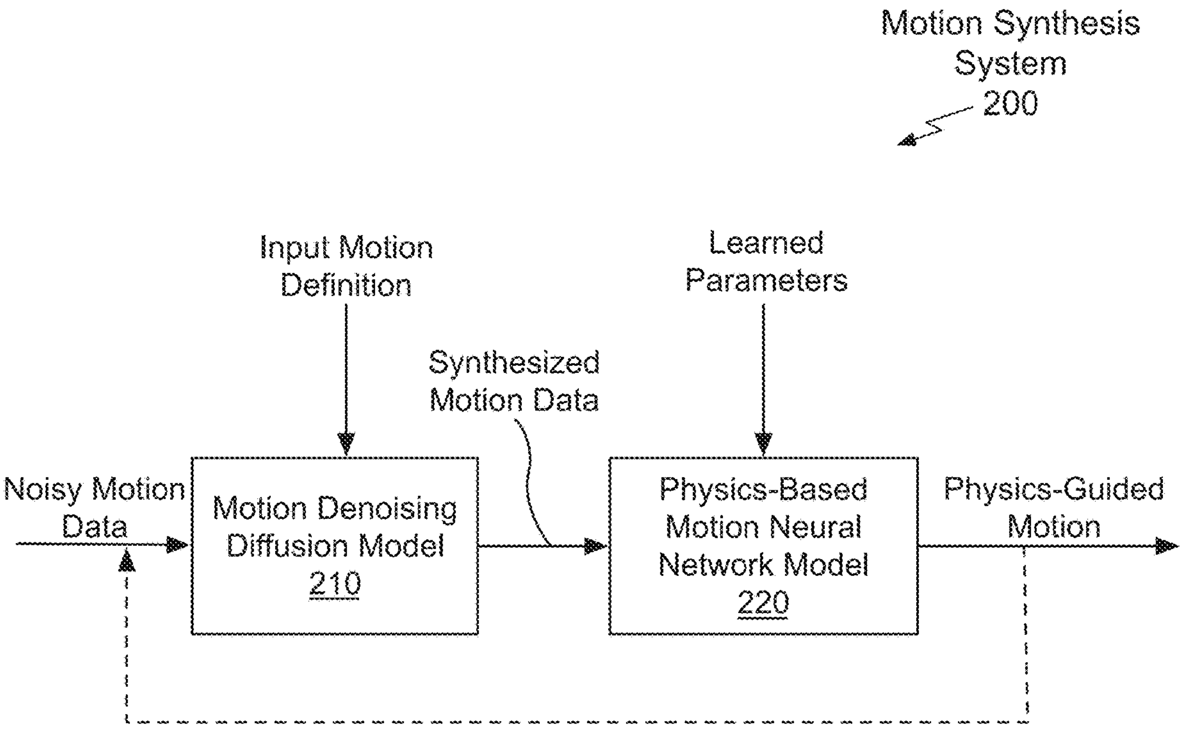
FIG. 2A illustrates a block diagram of an example motion synthesis system suitable for use in implementing some embodiments of the present disclosure.

FIG. 2A illustrates a block diagram of an example motion synthesis system 200 suitable for use in implementing some embodiments of the present disclosure. The motion synthesis system 200 comprises a motion denoising diffusion model 210 and a physics-based motion neural network model 220. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the motion synthesis system 200 is within the scope and spirit of embodiments of the present disclosure.

In an embodiment, the motion denoising diffusion model 210 is a pre-trained denoising diffusion model. In an embodiment, motion denoising diffusion model 210 is a conventional trained motion denoising diffusion model. The motion denoising diffusion model 210 receives noisy motion data and a motion definition (e.g., conditional information) as inputs. The input motion definition specifies a motion using text or an action label. In an embodiment, a text description or a verbal description is converted to the input motion definition, such as "a person slowly walks forward." The motion denoising diffusion model 210 generates synthesized motion data that approximates the input motion definition by mapping the noisy motion data and the input motion definition to produce synthesized motion data.

In an embodiment, the physics-based motion neural network model 220 is a learned physics-based motion projection operation that is combined with the motion denoising diffusion model 210 to enforce physical constraints. The physics-based motion neural network model 220 applies learned parameters to the synthesized motion data to generate physics-guided (synthesized) motion. The physics-based motion neural network model 220 enforces physical constraints when processing the synthesized motion data to generate the physics-guided motion.

As shown by the dashed feedback arrow in FIG. 2A, the physics-guided motion may be iteratively processed by the motion synthesis system 200 to reduce the artifacts. In an embodiment, the physics-guided motion is applied to a character model (parameterized mesh) associated with the character agent, where the character model comprises the human body model, an animal body model, or an object model. In an embodiment, the physics-based motion neural network model 220 is trained to determine learned parameters that are specific to the character model to which the physics-guided motion is applied.

For a first iteration, the noisy motion data may be initial noise data. Subsequent iterations process the physics-guided motion synthesized by the motion synthesis system 200 to further reduce the artifacts. In an embodiment, the physics-based motion neural network model 220 is selectively disabled for one or more of the iterations (timesteps t), particularly the first iteration of N iterations (timesteps). When the physics-based motion neural network model 220 is disabled for an iteration, the synthesized motion data is passed through the physics-based motion neural network model 220 without being processed and is output as the physics-guided motion to be processed by the motion denoising diffusion model 210 as the noisy motion data for the next iteration.

One may consider iterating using only the motion denoising diffusion model 210 and disabling or bypassing the physics-based motion neural network model 220 until the last iteration. However, such a strategy can produce unnatural motions since the synthesized motion data generated by the motion denoising diffusion model 210 may be too physically implausible to be corrected by a single physics-based projection iteration. Instead, enabling the physics-based motion neural network model 220 for particular iterations keeps the synthesized motion close to the data distribution while moving toward the physically plausible space. A trade-off between physical plausibility and motion quality is observed when the number of iterations for which the physics-based projection is enabled (physics-based projection iterations) is varied. Specifically, enabling the physics-based motion neural network model 220 for more iterations leads to better physical plausibility and motion quality before a certain number of iterations is completed, going beyond the number starts to deteriorate the motion quality, i.e., the resulting synthesized motion satisfies the physical constraints but still may look unnatural. Consequently, a balanced number of physics-based projection iterations may be determined where both high physical plausibility and motion quality is achieved. In an embodiment, enabling the physics-based projection for later iterations performs better than enabling the physics-based projection for early steps. A possible explanation is that synthesized motions from early iterations may tend toward the mean motion of the diffusion training data and the physics-based projection pushes the synthesized motion further away from the data distribution, thus hampering the diffusion process.

For text-to-motion generation, the motion synthesis system 200 outperforms a motion conventional motion diffusion model significantly for a standard benchmark, reducing physics errors by more than 86% while also improving the motion quality by more than 20% as measured by the Frechet inception distance (FID). For action-to-motion generation, motion synthesis system 200 again improves the physics error metric by more than 78% on a standard benchmark while also achieving competitive FID scores.

Given the input motion definition (conditional information c), the motion synthesis system 200 generates a physically plausible human motion $$x^{1:H} = \{x^h\}_{h=1}^{H}$$

of length H. Each pose $x^h \in \mathbb{R}^{J\times D}$ in the generated physics-guided motion is represented by the D-dimensional features of J joints, which can be either the joint positions or angles. Starting from noisy motion data $$x_T^{1:H},$$

the motion synthesis system 200 models the denoising distribution $$q(x_s^{1:H} | x_t^{1:H}, \mathcal{P}_\pi, c)$$

that denoises the physics-guided motion from diffusion timestep t to s, where (s<t). Iteratively applying the motion synthesis system 200 denoises the physics-guided motion into a clean motion $$x_0^{1:H},$$

which becomes the final physics-guided motion that is output, $x^{1:H}$. A critical component in the motion synthesis system 200 is the physics-based motion neural network model 220, a physics-based motion projection module $\mathcal{P}_\pi$ that enforces physical constraints. The physics-based motion neural network model 220 leverages a motion imitation policy π to mimic the denoised motion of a diffusion iteration in a physics simulator, the resulting synthesized physics-guided motion further guides the diffusion process.

To simplify notations, the explicit dependence over the input motion definition (condition) c may be omitted. Note that the motion denoising diffusion model 210 can be trained with some condition c; even for the unconditional case, the motion denoising diffusion model 210 can be conditioned on a universal null token Ø. Let $p_0(x)$ denote the data distribution, and define a series of time-dependent distributions $p_t(x_t)$ by injecting i.i.d. Gaussian noise to samples from $p_0$, i.e., $$p_t(x_t|x) = \mathcal{N}(x, \sigma_t^2 I),$$

where $\sigma_t$ defines a series of noise levels that is increasing over time such that $\sigma_0=0$ and $\sigma_T$ for the largest possible T is much bigger than the standard deviation of the data. Generally, diffusion models draw samples by solving the following stochastic differential equation (SDE) from t=T to t=0:

$$dx = -(\beta_t + \dot{\sigma}_t)\sigma_t \nabla_x \log p_t(x)dt + \sqrt{2\beta_t}\,\sigma_t d\omega_t, \quad \text{Eq. (1)}$$

where $\nabla_x \log p_t(x)$ is the score function, co t is the standard Wiener process, and $\beta_t$ controls the amount of stochastic noise injected in the process; when $\beta_t=0$, the SDE becomes and ordinary differential equation (ODE). A notable property of the score function $\nabla_x \log p_t(x_t)$ is that it re-covers the minimum mean squared error (MMSE) estimator of x given $$\tilde{x} := \mathbb{E}[x|x_t] = x_t + \sigma_t^2 \nabla_{x_t} \log p_t(x_t), \quad \text{Eq. (2)}$$

Where the synthesized motion data, x̃ that is generated by the motion denoising diffusion model 210 can essentially be treated as a "denoised" version of $x_t$. Since $x_t$ and $\sigma_t$ are known during sampling, $\nabla_{x_t} \log p_t(x_t)$ can be obtained from x̃, and vice versa.

Diffusion models, such as the motion denoising diffusion model 210 approximate the score function with the following denoising autoencoder objective:

$$\mathbb{E}_{x\sim p_0(x), t\sim p(t)\epsilon\sim p(\epsilon)}\left[\lambda(t)\|x - D(x+\sigma_t\epsilon, t, c)\|_2^2\right] \quad \text{Eq. (3)}$$

where D is the motion denoising diffusion model 210 that depends on the noisy data, the time t and the condition c, ϵ~

$\mathcal{N}$ (0, I), p(t) is a distribution from which time is sampled, and λ(t) is the loss weighting factor. The optimal solution to D would be one that recovers the MMSE estimator $\tilde{x}$ according to Eq. (2).

After the motion denoising diffusion model 210 is trained, one can apply it to solve the SDE/ODE in Eq. (1). In an embodiment, DDIM (denoising diffusion implicit models), a one-iteration update is performed from time t to time s (s<t) given the sample $x_t$, which is described in the DDIM sampling algorithm shown below in TABLE 1.

TABLE 1

| DDIM Sampling Algorithm |
|---|
| 1: Input: Denoiser D, sample $x_t$ at time t, target time s, condition c, hyperparameter $\eta \in [0, 1]$. |
| 2: Compute the denoised result $\tilde{x} := D(x_t, t, c)$. |
| 3: Obtain variance $\nu_s$ as a scalar that depends on η. |
| 4: Obtain mean $\mu_s$ as a linear combination of $\tilde{x}$ and $x_t$: $\mu_s := \tilde{x} + \frac{\sqrt{\sigma_s^2 - \nu_s}}{\sigma_t}(x_t - \tilde{x})$ |
| 5: Draw sample $x_s \sim \mathcal{N}(\mu_s, \nu_s I)$. |

Intuitively, the sample $x_s$ at time s is generated from a Gaussian distribution; its mean is a linear interpolation between $x_t$ and the denoised result $\tilde{x}$, and its variance depends on a hyperparameter $\eta \in [0,1]$. Specifically, η=0 corresponds to denoising diffusion probabilistic models (DDPM) and η=1 corresponds to denoising diffusion implicit models (DDIM). In an embodiment, η=0 produces better performance for the motion denoising diffusion model 210. Since the above sampling algorithm is general, it can also be applied to the physics-guided motion, i.e., $x^{1:H}$. To incorporate the condition c during sampling, one can employ classifier-based or classifier-free guidance.

Conventional diffusion models for generating character motion are not necessarily trained on data that complies with physical constraints, and even if they are, there is no guarantee that the produced motion samples are still physically realizable, due to the approximation errors in the denoiser networks and the stochastic nature of the sampling process. While one may attempt to directly correct the final motion sample to be physically plausible, the physical errors in the motion might be so large that even after such a correction, the motion still exhibits artifacts. To address such issues, the fact that diffusion models produce intermediate estimates of the desired outcome, i.e., the denoised motion, synthesized motion data $\tilde{x}^{1:H}$ generated by the motion denoising diffusion model 210 for each iteration of N diffusion iterations is exploited. In particular, the physical constraints may be applied not only to the final iteration of the diffusion process, but to the intermediate iterations as well.

The physics-based motion neural network model 220 performs the physics-based motion projection $\mathcal{P}_\pi$: $\mathbb{R}^{H\times J\times D} \to \mathbb{R}^{H\times J\times D}$ that maps the original motion $\tilde{x}^{1:H}$ to a physically-plausible one, denoted as $\hat{x}^{1:H}$. $\mathcal{P}_\pi$ is a projection, so repeatedly applying the projection would not further improve the motion, since $\mathcal{P}_\pi(\mathcal{P}_\pi(\tilde{x}^{1:H}))=\mathcal{P}_\pi(\tilde{x}^{1:H})$. The physics-based projection $\mathcal{P}_\pi$ is incorporated into the denoising diffusion sampling procedure, where the one-iteration up-date from time t to time s is described in a second sampling algorithm for motion shown below in TABLE 2. The process differs from the DDIM sampler mostly in terms of performing the additional physics-based projection to enforce physical constraints. The physics-based motion neural network model 220 is agnostic to the specific instantiation of the denoiser D implemented as the motion denoising diffusion model 210. In an embodiment, the physics-based projection performed by the physics-based motion neural network model 220 is also only selectively applied during diffusion sampling (inference), which makes the physics-based motion neural network model 220 generally compatible with different pretrained motion diffusion models. In other words, physics-based motion neural network model 220 can be used to improve the physical plausibility of existing diffusion models without retraining.

TABLE 2

| Sampling Algorithm for Motion |
|---|
| 1: Input: Denoiser D, sample $x_t^{1:H}$ at time t, condition c. target time s, physics-based projection $\mathcal{P}_\pi$, $\eta \in [0, 1]$. |
| 2: Compute the denoised motion $\tilde{x}^{1:H} := D(x_t^{1:H}, t, c)$. |
| 3: if projection is performed at time t then |
| 4: $\hat{x}^{1:H} := \mathcal{P}_\pi(\tilde{x}^{1:H})$ # Physics-Based Projection |
| 5: else |
| 6: $\hat{x}^{1:H} := \tilde{x}^{1:H}$ |
| 7: end if |
| 8: # The remaining part is similar to DDIM |
| 9: Obtain variance $\nu_s$ as a scalar that depends on η. |
| 10: Obtain mean $\mu_s$: $\mu_s := \hat{x}^{1:H} + \frac{\sqrt{\sigma_s^2 - \nu_s}}{\sigma_t}\left(x_t^{1:H} - \hat{x}^{1:H}\right)$ |
| 11: Draw sample $x_s^{1:H} \sim \mathcal{N}(\mu_s, \nu_s I)$. |

Due to the use of physics simulation, the projection $\mathcal{P}_\pi$ is rather expensive, and it may be infeasible to perform the projection at every diffusion timestep. Therefore, when physics-based projection iterations are enabled for a limited number of the N diffusion iterations, certain timesteps may be prioritized over other timesteps. In an embodiment, physics projection is not performed when the diffusion noise level is high. The denoiser D by design gives $\tilde{x}^{1:H}=$ $$\mathbb{E}[x^{1:H} \mid x_t^{1:H}],$$

i.e., the mean motion of $x^{1:H}$ given the current noisy motion $$x_t^{1:H},$$

which is close to the mean of the training data for high noise levels when the condition $$x_t^{1:H}$$

contains little information. Empirically, the mean motion often has little body movement due to mode averaging while still having some root translations and rotations, which is clearly physically-implausible. Correcting such a physically-incorrect motion with the physics-based projection would push the motion further away from the data distribution and hinder the diffusion process. A favorable scheduling strategy that selectively enables the physics-based motion neural network model 220 to perform the projection $\mathcal{P}_\pi$ balances sample quality and efficiency.

An essential component in the physics-guided diffusion process is the physics-based motion projection $\mathcal{P}_\pi$ that projects the denoised motion $\tilde{x}^{1:H}$ of a diffusion iteration, which disregards the laws of physics, into a physically plausible motion $\hat{x}^{1:H}=\mathcal{P}_\pi(\tilde{x}^{1:H})$. The projection is achieved by learning a motion imitation policy $\pi$ that controls a simulated character (character model) to mimic the denoised motion $\tilde{x}^{1:H}$ in a physics simulator. The resulting motion $\hat{x}^{1:H}$ from the simulator is considered physically plausible since it obeys the laws of physics. Combining the physics-based motion projection $\mathcal{P}_\pi$ performed by the physics-based motion neural network model 220 with the diffusion process avoids the synthesized motion artifacts that occur using conventional techniques by enforcing physical constraints during motion synthesis.

Figure 2B:
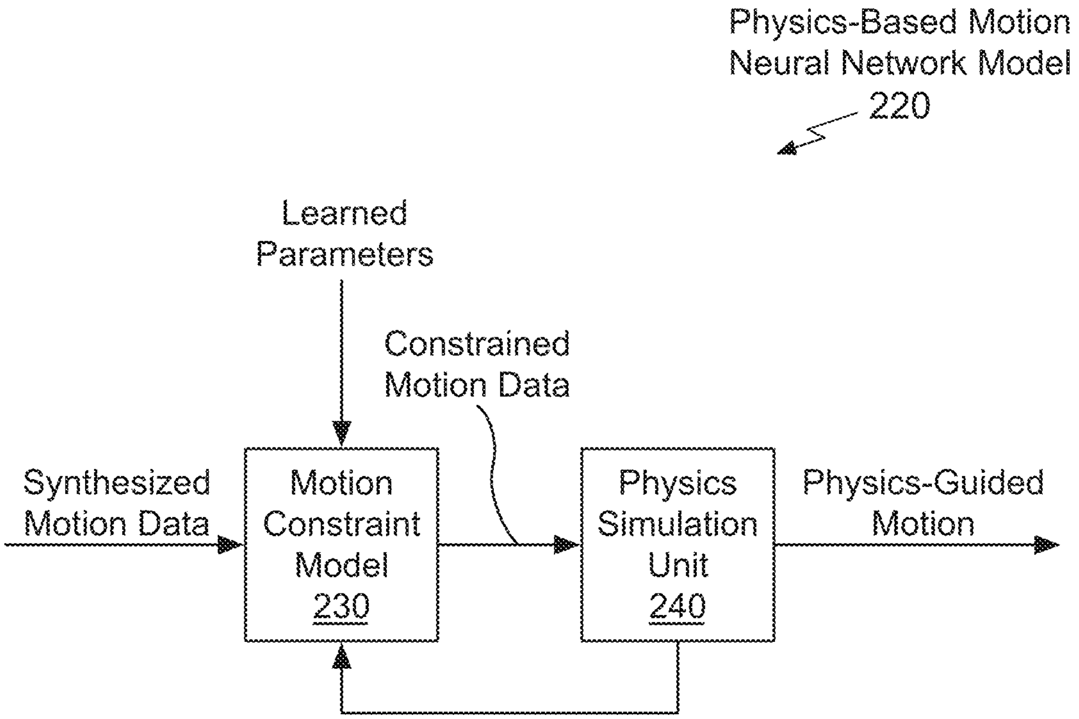
FIG. 2B illustrates an example physics-based motion neural network model for the motion synthesis system shown in FIG. 2A, in accordance with an embodiment.

FIG. 2B illustrates an example physics-based motion neural network model 220 for the motion synthesis system 200 shown in FIG. 2A, in accordance with an embodiment. The physics-based motion neural network model 220 comprises a motion constraint model 230 and a physics simulation unit 240. The motion constraint model 230 is trained to provide learned parameters for the motion imitation policy that are specific to the character to which the physics-guided motion is translated. Likewise, the physics simulation unit 240 is configured to operate on the model of the specific character.

The motion constraint model 230 applies the learned parameters to the synthesized motion data to adapt the synthesized motion data to physical constraints of an environment on the character. The physical constraints of the environment may include forces (gravity) and surfaces and volumes of contact constraints (solid ground, water, etc.). The motion constraint model 230 produces constrained motion data that is processed by the physics simulation unit 240 to produce the physics-guided motion. The physics-guided motion may be iteratively processed by the motion constraint model 230 and the physics simulation unit 240 to apply physics-based guidance to each frame or pose comprising the input motion definition. In an embodiment, the synthesized motion data output by the motion denoising diffusion model 210 includes a current physical state of the character and a target physical state (next pose from the input motion definition) represented as joint positions and rotations. In an embodiment, before being processed by the motion constraint model 230, the physical and target physical states are converted into joint angles, joint velocities, and rigid bodies' positions, rotations, and linear and angular velocities (torques). After processing by the motion synthesis system 200 is complete, the physics-guided motion is converted from the joint angles and angular velocities to the joint positions and rotations that animate (define motion of) the character model.

The task of human motion imitation can be formulated as a Markov decision process (MDP). The MDP is defined by a tuple $\mathcal{M}=(\mathcal{S}, \mathcal{A}, T, \mathcal{R}, \gamma)$ of states, actions, transition dynamics, a reward function, and a discount factor, respectively. A character agent acts in a physics simulator according to a motion imitation policy $\pi(a^h|s^h)$, which models the distribution of choosing an action $a^h\in\mathcal{A}$ given the current state $s^h\in\mathcal{S}$. The state $s^h$ comprises the character's physical state (e.g., joint angles, velocities, positions) as well as the next pose $\tilde{x}^{h+1}$ from the input motion. Including $\tilde{x}^{h+1}$ in the state informs the policy $\pi$ to choose an action $a^h$ that can mimic $\tilde{x}^{h+1}$ in the simulator. Starting from an initial state $s^1$, the character iteratively samples an action $a^h$ from the motion imitation policy $\pi$ and the simulator with transition dynamics $T(s^{h+1}|s^h, a^h)$ generates the next state $s^{h+1}$, from which the simulated pose $\hat{x}^{h+1}$ can be extracted. By executing the motion imitation policy for H iterations (steps), the physically-simulated motion $\hat{x}^{1:H}$ is obtained. Within each of the N diffusion iterations for which the physics-based motion neural network model 220 is enabled, the motion imitation policy is executed for H iterations.

During training, a reward $r^h$ is also assigned to the character based on how well the simulated motion $\hat{x}^{1:H}$ aligns with the ground-truth motion $\bar{x}^{1:H}$. Note that, in an embodiment, the motion imitation policy $\pi$ is trained on large motion capture datasets where high-quality ground-truth motion is available. Reinforcement learning (RL) may be used to learn the policy $\pi$, where the objective is to maximize the expected discounted return $J(\pi)=\mathbb{E}_\pi[\Sigma_h\gamma^h r^h]$ which translates to mimicking the ground-truth motion as closely as possible. A standard RL algorithm, such as PPO may be adopted to solve for the optimal policy.

The reward function is designed to encourage the simulated motion $\hat{x}^{1:H}$ to match the ground truth $\bar{x}^{1:H}$. The notation $\dot{\blacksquare}$, denotes ground-truth quantities. The reward $r^h$ at each timestep consists of four sub-rewards:

$$r^h = w_p r_p^h + w_v r_v^h + w_j r_j^h + w_q r_q^h, \quad \text{Eq. (4)}$$

$$r_p^h = \exp\left[-\alpha_p\left(\sum_{j=1}^{J}\|o_j^h \ominus \bar{o}_j^h\|^2\right)\right], \quad \text{Eq. (5)}$$

$$r_v^h = \exp\left[-\alpha_v\|v^h - \bar{v}^h\|^2\right], \quad \text{Eq. (6)}$$

$$r_j^h = \exp\left[-\alpha_j\left(\sum_{j=1}^{J}\|p_j^h - \bar{p}_j^h\|^2\right)\right], \quad \text{Eq. (7)}$$

$$r_q^h = \exp\left[-\alpha_q\left(\sum_{j=1}^{J}\|q_j^h - \bar{q}_j^h\|^2\right)\right], \quad \text{Eq. (8)}$$

where $w_p$, $w_v$, $w_j$, $w_q$, $\alpha_p$, $\alpha_v$, $\alpha_j$, $\alpha_q$ are weighting factors. The pose reward $$r_p^h$$

measures the difference between the local joint rotations and the ground truth, where $\ominus$ denotes the relative rotation between two rotations, and $\|\cdot\|$ computes the rotation angle. The velocity reward $$r_v^h$$

measures the mismatch between joint velocities $v^h$ and the ground truth $\bar{v}^h$, which are computed via finite difference. The joint position reward $$r_j^h$$

encourages the 3D world joint positions $$p_j^h$$

to match the ground truth $$\bar{p}_j^h.$$

Finally, the joint reward $$r_q^h$$

measures the difference between the global joint rotations $$q_j^h$$

and the ground truth $$\bar{q}_j^h.$$

The character state $s^h$ comprises the current physical state of the character, the input motion's next pose $\tilde{x}^{x+1}$, and a character attribute vector $\psi$. The physical state of the character comprises joint angles, joint velocities, and rigid bodies' positions, rotations, and linear and angular velocities specific to the character model. For the input pose $\tilde{x}^{h+1}$, the state $s^h$ contains the difference of $\tilde{x}^{h+1}$ w.r.t. the character in joint angles as well as rigid body positions and rotations. Using the difference informs the policy about the pose residual for which the policy needs to compensate. All the features are computed in the character's heading coordinate to ensure rotation and translation invariance. In an embodiment, because the character model is based on the SMPL body model, the attribute $\psi$ includes the gender and SMPL shape parameters to allow the policy to control different characters. In an embodiment, the target joint angles of proportional derivative (PD) controllers are used as the action representation, which enables robust motion imitation. Residual forces may also be added in the action space to stabilize the character and compensate for any dynamics mismatch.

In an embodiment, a parameterized Gaussian policy $\pi(a^h|s^h)=\mathcal{N}(\mu_\theta(s^h), \Sigma)$ is used for the policy, where the mean action $\mu_\theta$ is output by a simple multi-layer perceptron (MLP) network with parameters $\theta$, and $\Sigma$ is a fixed diagonal covariance matrix. Note that the mean action $\mu_0$ may be directly used during inference to remove noise and achieve better imitation performance.

Figure 2C:
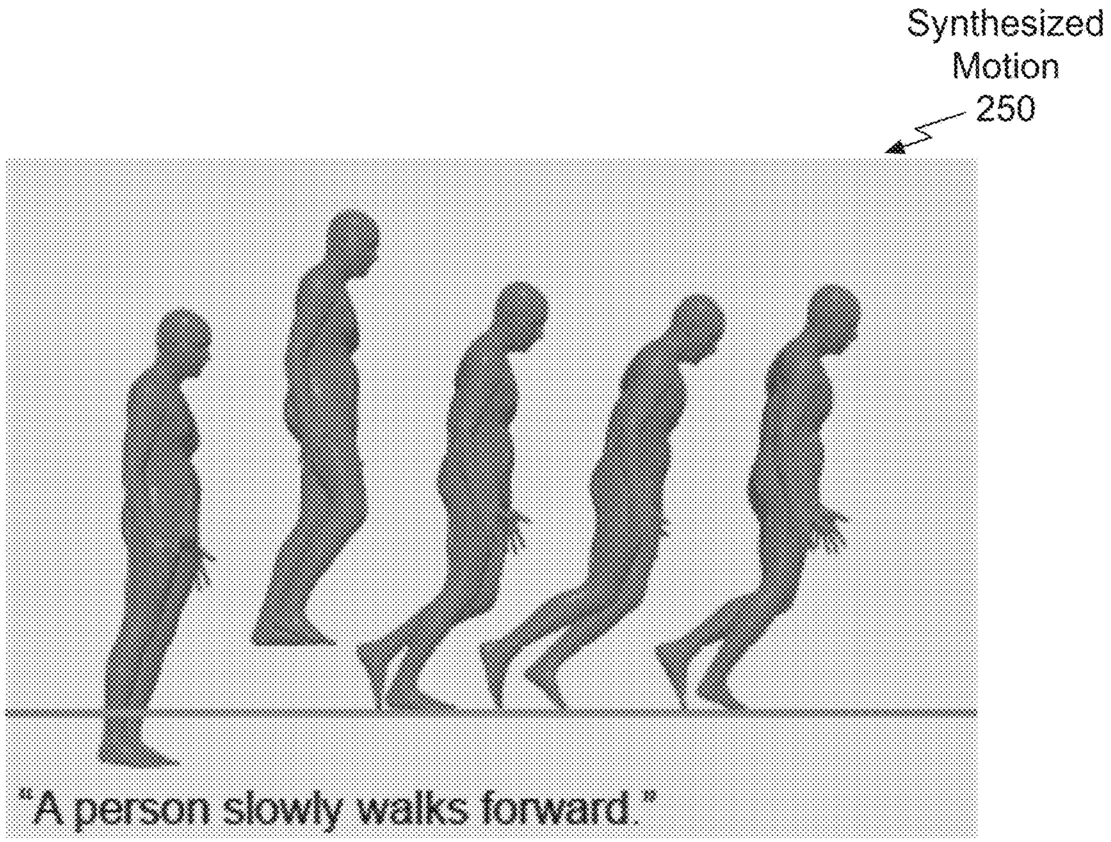
FIG. 2C illustrates synthesized physics-guided motion generated by the physics-guided motion synthesis system, in accordance with an embodiment.
Figure 2C:
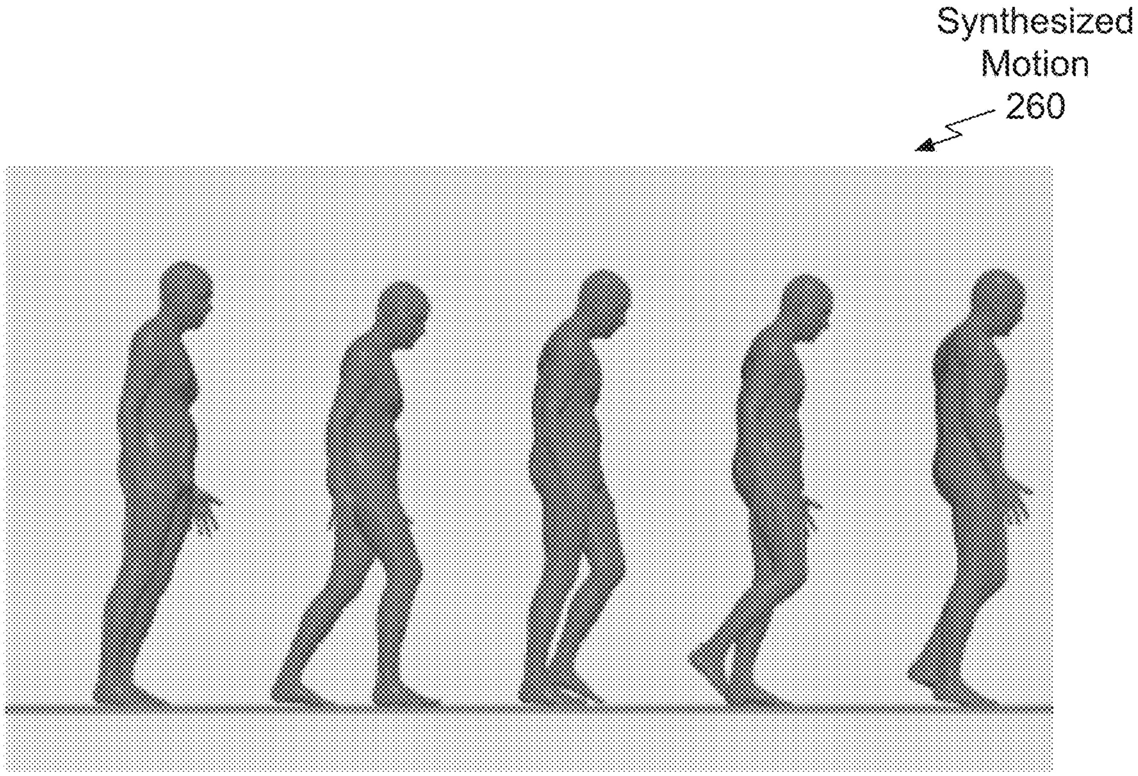

FIG. 2C illustrates synthesized motion 250 and 260 generated by a physics-guided motion synthesis system 200, in accordance with an embodiment. The text description or a verbal description "a person slowly walks forward" is converted to the input motion definition that is processed by the motion synthesis system 200 to produce physics-guided motion that approximates the input motion definition. Performing one physics-based projection iteration by the physics-based motion neural network model 220 at the end of the motion denoising diffusion processing (during the last iteration of N diffusion iterations) yields unnatural motion since the motion is too physically implausible to correct in one iteration. The synthesized motion 250 illustrates synthesized motion for a human character using only one iteration with the physics-based motion neural network model 220 enabled. Multiple projection iterations solves the issue of unnatural motion by iteratively applying both physics and diffusion during motion synthesis. The synthesized motion 260 illustrates synthesized motion for the human character with the physics-based motion neural network model 220 enabled for four projection iterations during the processing iterations performed by the motion synthesis system 200.

Figure 3:
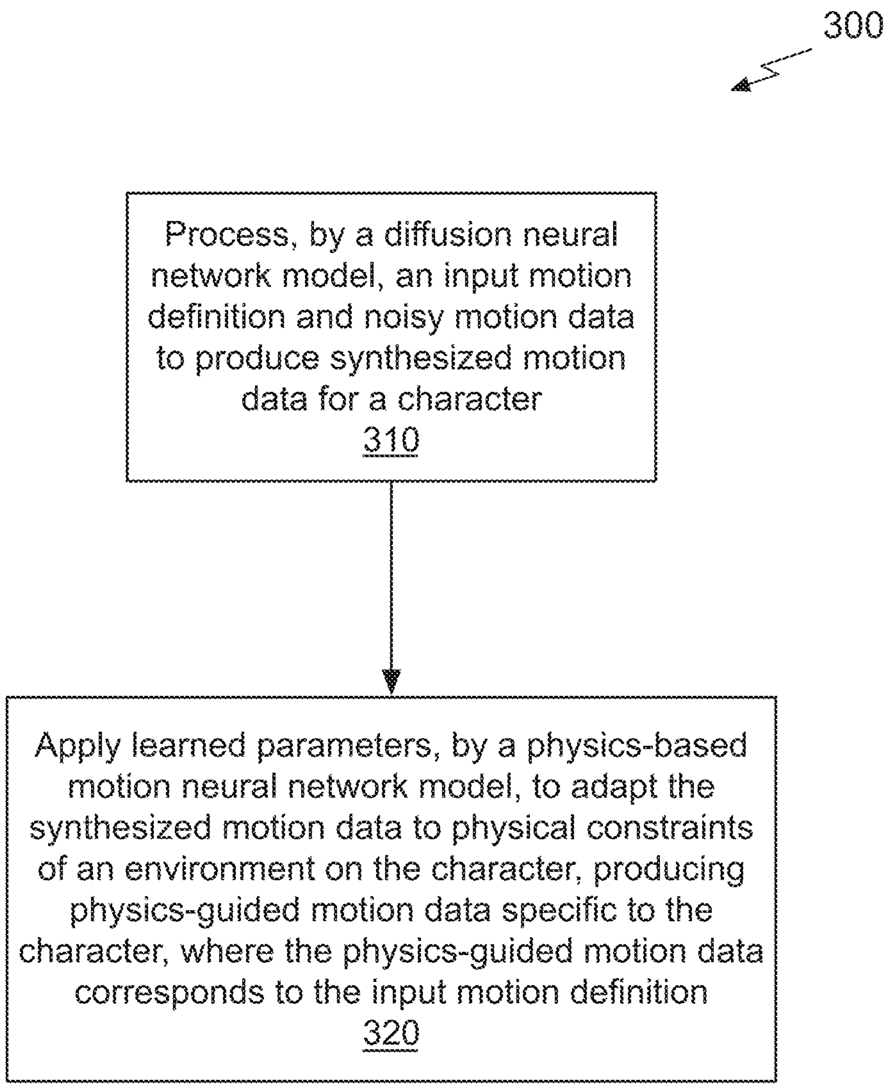
FIG. 3 illustrates a flowchart of a method for synthesizing motion using a physics-guided motion diffusion model, in accordance with an embodiment.

FIG. 3 illustrates a flowchart of a method 300 for synthesizing motion using a physics-guided motion diffusion model, in accordance with an embodiment. Each block of method 300, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 300 is described, by way of example, with respect to the motion synthesis system 200 of FIG. 2A. However, this method may additionally or alternatively be executed by any one system, or any combination of systems, including, but not limited to, those described herein. Furthermore, persons of ordinary skill in the art will understand that any system that performs method 300 is within the scope and spirit of embodiments of the present disclosure.

At step 310, an input motion definition and noisy motion data are processed, by a diffusion neural network model, to produce synthesized motion data for a character. In an embodiment, the diffusion neural network model comprises the motion denoising diffusion model 210. In an embodiment, the synthesized motion data encodes a motion artifact including at least one of floating above a ground surface, appendage sliding along the ground surface, and penetration of the ground surface. In an embodiment, the character comprises one of a human body mesh, an animal body mesh, or an object mesh.

At step 320, learned parameters are applied, by a physics-based motion neural network model, to adapt the synthesized motion data to physical constraints of an environment on the character, producing physics-guided motion data specific to the character, where the physics-guided motion data corresponds to the input motion definition. In an embodiment, the physics-based motion neural network model comprises the physics-based motion neural network model 220. In an embodiment, the physics-based motion neural network model removes or reduces the motion artifact from the synthesized motion data. In an embodiment, the diffusion neural network model processes the input motion definition and initial noise data (without processing by the physics-based motion neural network model) to produce the noisy motion data. In an embodiment, the diffusion neural network model processes the input motion definition and initial noise data for at least one iteration, without enabling the physics-based motion neural network model, to produce the noisy motion data. In an embodiment, the processing and applying are repeated to produce second physics-guided motion data that more closely corresponds to the input motion definition compared with the physics-guided motion data, with the physics-guided motion data replacing the noisy motion data for each successive iteration of the processing and applying.

In an embodiment, the physics-based motion neural network model comprises: a motion constraint unit that is configured to apply the parameters to the synthesized motion data to produce modified motion data; and a physics simulator that translates the modified motion data to a parameterized mesh of the character to produce the physics-guided motion data. In embodiment, the motion constraint unit and the physics simulator comprise the motion constraint model 230 and the physics simulation unit 240. In an embodiment, the physics-based motion neural network model repeats the applying for multiple poses associated with the synthesized motion data. In an embodiment, the synthesized motion data comprises joint positions and rotations for the character, and before the learned parameters are applied, the joint positions and rotations for the character are converted into joint angles and velocities. In an embodiment, adapted joint angles and velocities generated by the physics-based motion neural network model are converted into the physics-guided motion data.

In an embodiment, at least one of steps 310 and/or 320 is performed on a server or in a data center to generate synthesized motion, and the synthesized motion is streamed to a user device. In an embodiment, at least one of steps 310 and/or 320 is performed within a cloud computing environment. In an embodiment, at least one of steps 310 and/or 320 is performed for training, testing, or certifying a neural network employed in a machine, robot, or autonomous vehicle. In an embodiment, at least one of steps 310 and/or 320 is performed on a virtual machine comprising a portion of a graphics processing unit.

The motion synthesis system 200 instills the laws of physics into the diffusion process to generate physically plausible motions for a character. The physics-based motion neural network model 220 performs a projection using motion imitation in physics simulation to enforce physical constraints to synthesize plausible motion with reduced (or no) artifacts. The physics-based motion neural network model 220 is agnostic to the particular denoising neural network model and can therefore be combined with a conventional denoising diffusion neural network model to improve synthesized motion without retraining the conventional denoising diffusion neural network model.

Parallel Processing Architecture

Figure 4:
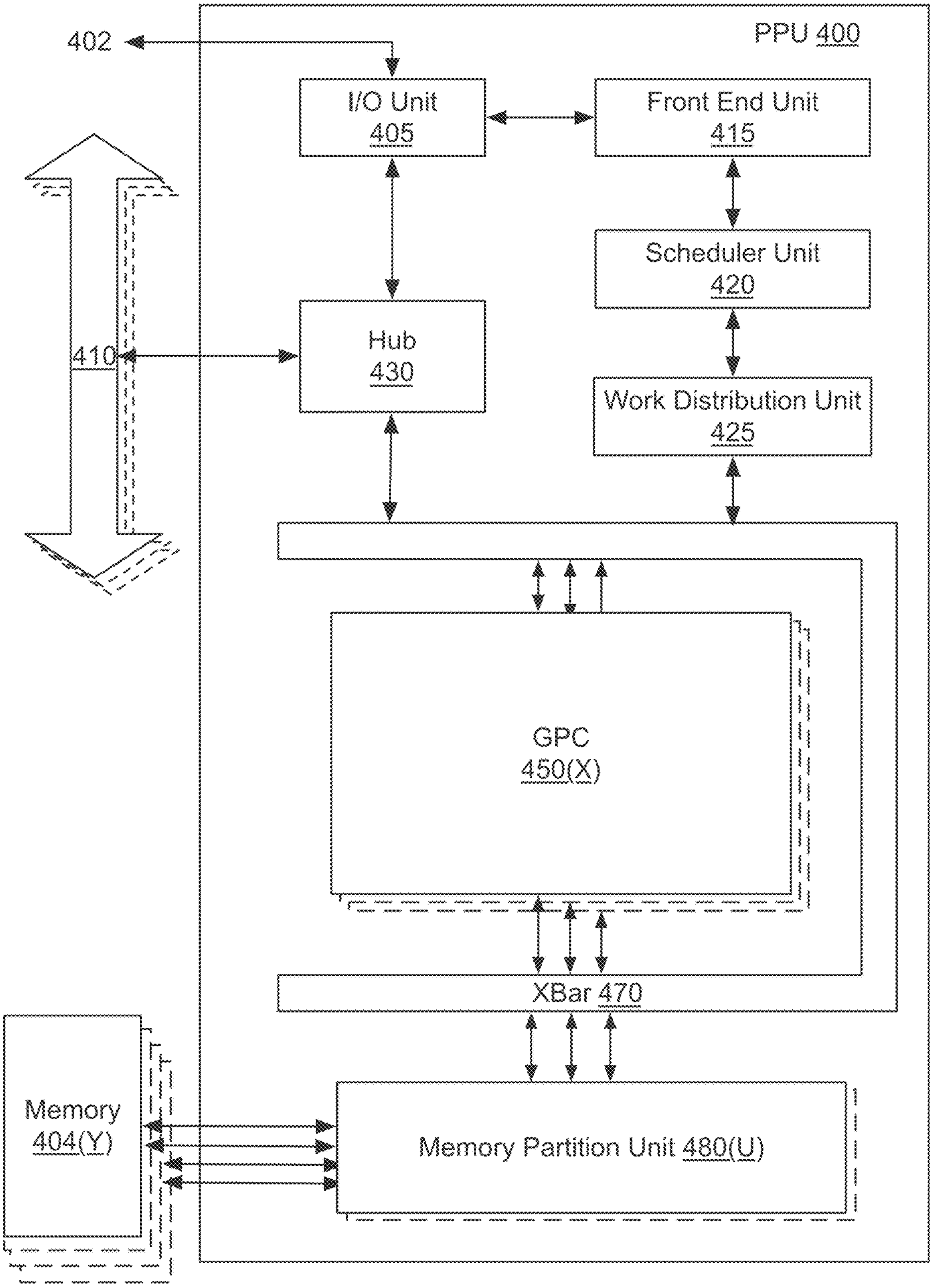
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the motion synthesis system 200. The PPU 400 may be used to implement one or more of the motion denoising diffusion model 210 and the physics-based motion neural network model 220 within the motion synthesis system 200. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in an L2 cache, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
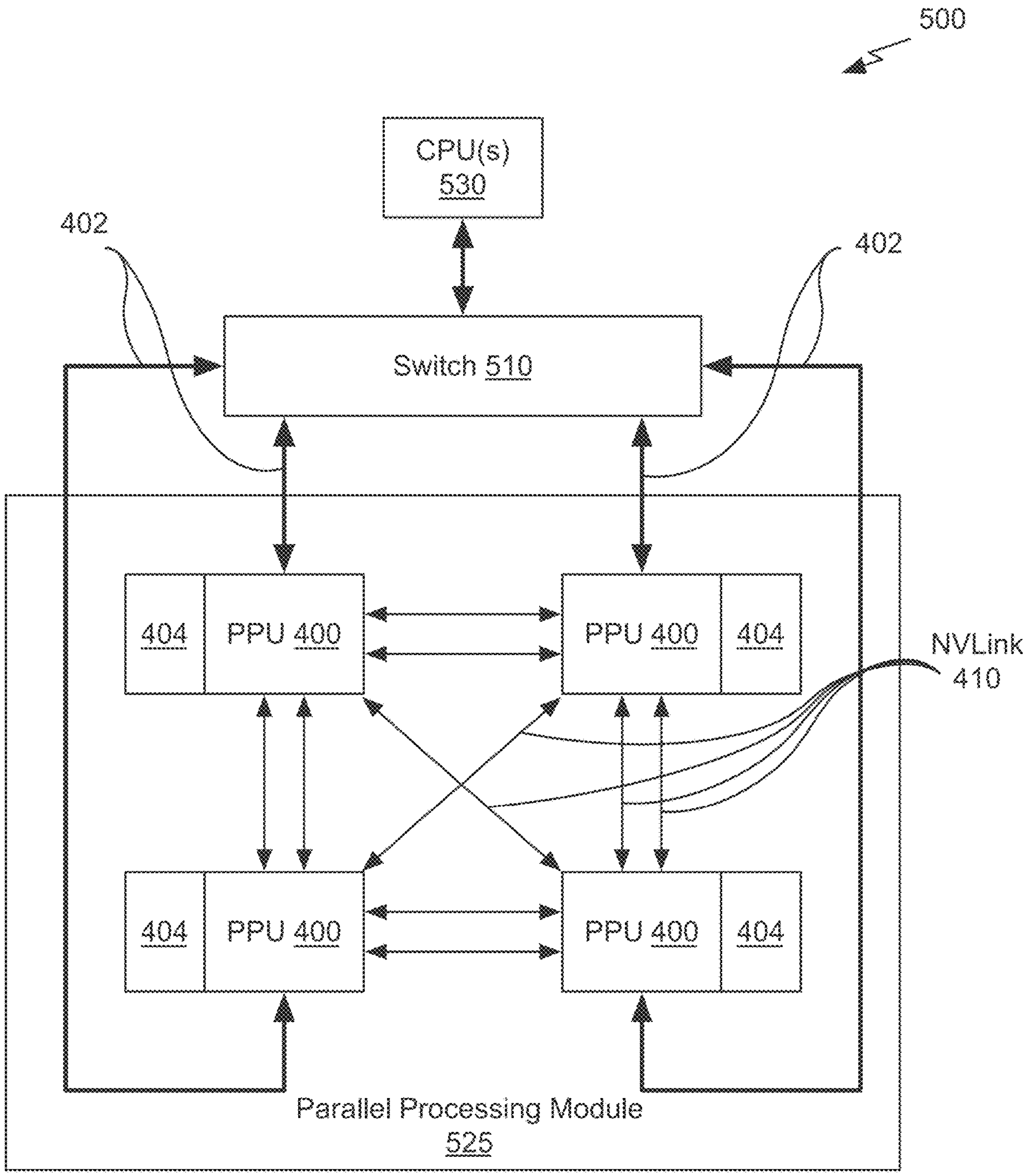
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to implement the method 300 shown in FIG. 3. The processing system 500 includes a CPU 530, switch 510, and multiple PPUs 400, and respective memories 404.

Figure 5B:
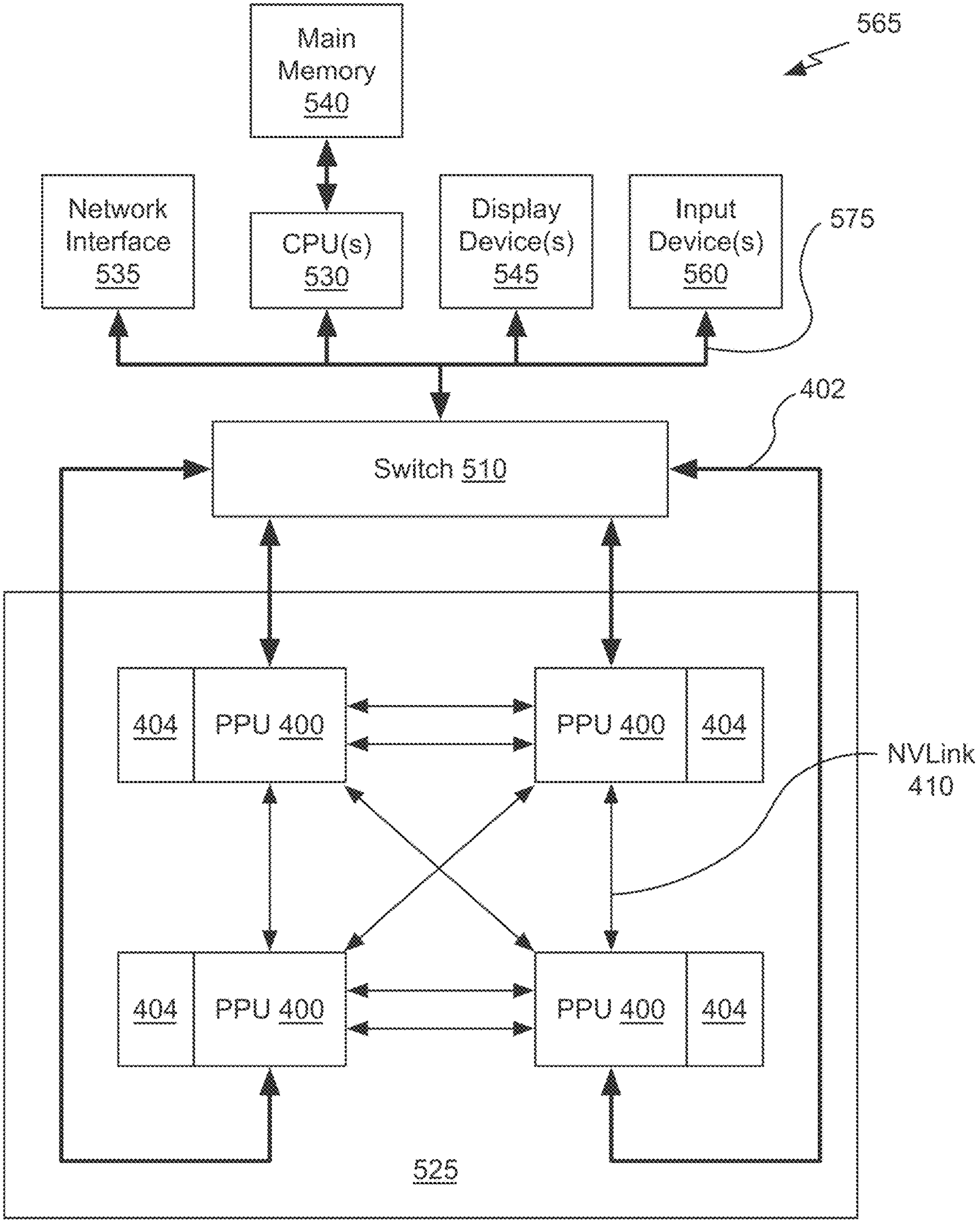
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 300 shown in FIG. 3. As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments — in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
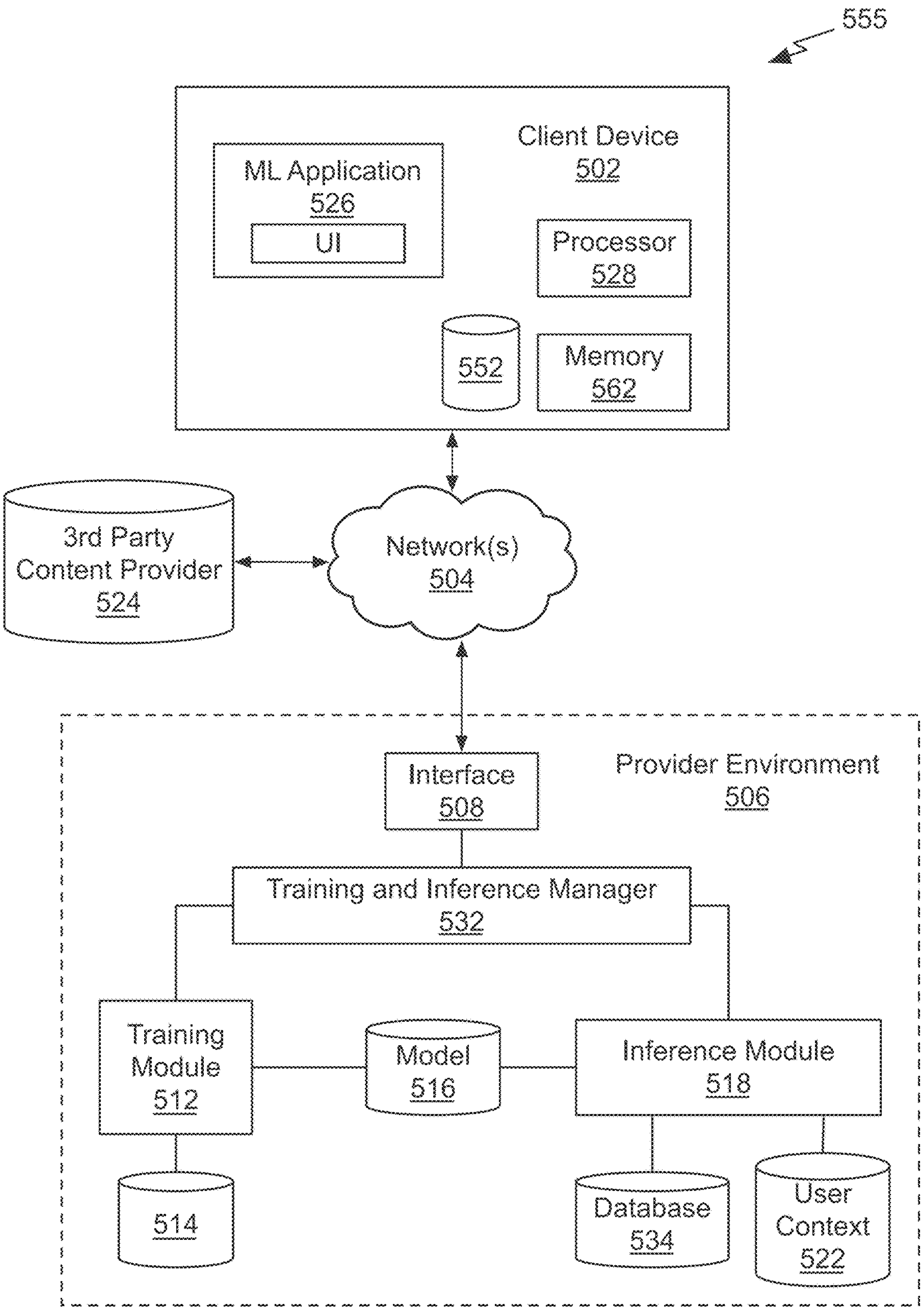
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Streaming System

Figure 6:
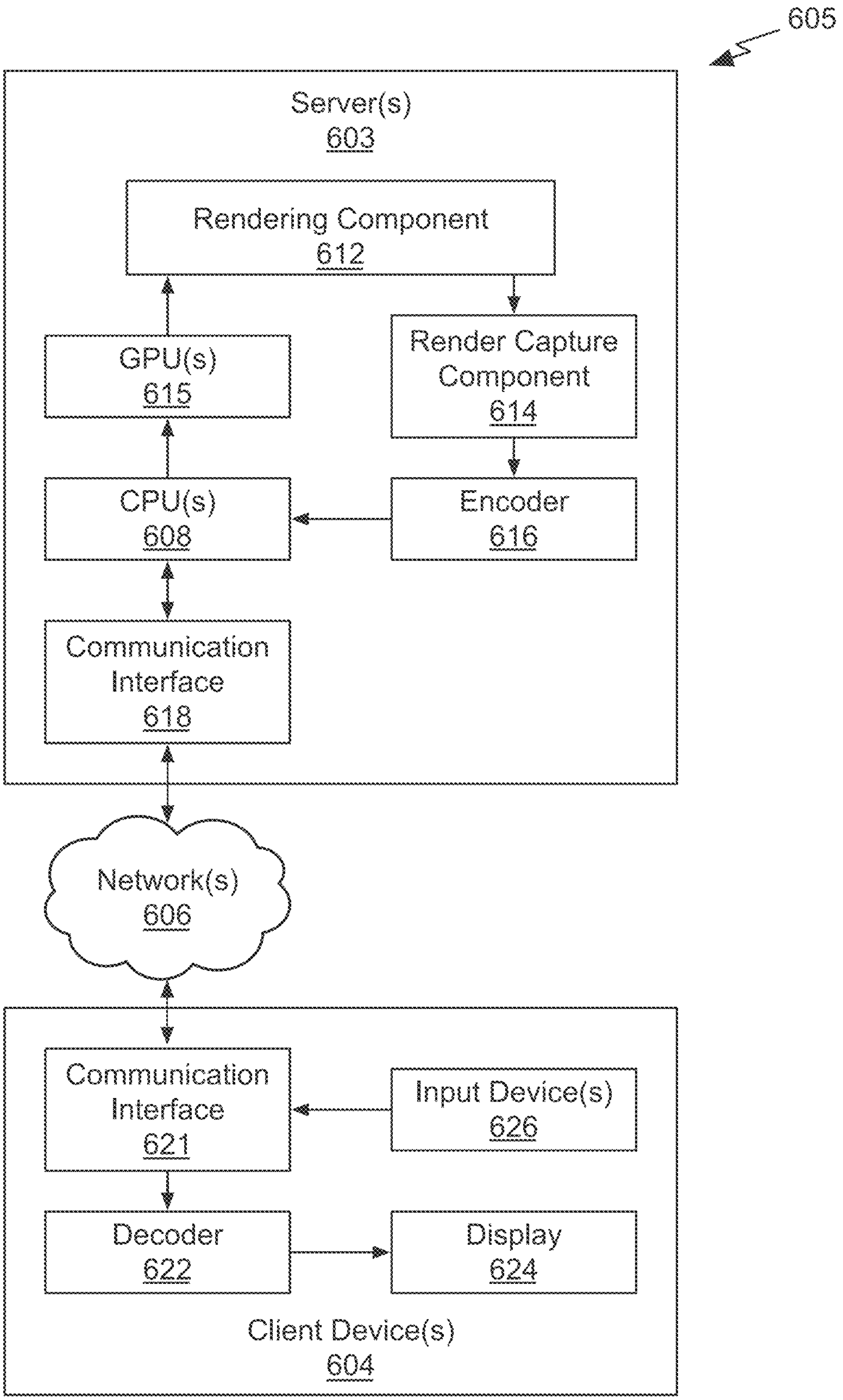
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network (s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method, comprising:

processing, by a diffusion neural network model, an input motion definition and noisy motion data to produce synthesized motion data for a character for a diffusion timestep of multiple diffusion timesteps;

selectively disabling processing by a physics-based motion neural network model based on a mean motion of a denoising distribution and a noise level of the synthesized motion data, wherein the mean motion corresponds to physically-incorrect motion;

for each diffusion timestep that a physics-based motion neural network model is not disabled, applying learned parameters, by the physics-based motion neural network model, to adapt the synthesized motion data to physical constraints of an environment on the character producing physics-guided motion data that is specific to the character and physically plausible, wherein the physics-guided motion data corresponds to the input motion definition;

for each specific diffusion timestep that the physics-based motion neural network model is disabled, providing the synthesized motion data as the physics-guided motion data; and repeating the processing and applying for one or more remaining diffusion timesteps, wherein the physics-guided motion data replaces the noisy motion data for each iteration of the processing and applying.

2. The method of claim 1, wherein the synthesized motion data encodes a motion artifact including at least one of floating above a ground surface, appendage sliding along the ground surface, and penetration of the ground surface.

3. The method of claim 2, wherein the physics-based motion neural network model removes the motion artifact from the synthesized motion data.

4. The method of claim 1, wherein the character comprises one of a human body mesh, an animal body mesh, or an object mesh.

5. The method of claim 1, further comprising processing, by the diffusion neural network model, the input motion definition and initial noise data to produce the noisy motion data.

6. The method of claim 1, wherein the physics-based motion neural network model comprises:

a motion constraint unit that is configured to apply the parameters to the synthesized motion data to produce modified motion data; and a physics simulator that translates the modified motion data to a parameterized mesh of the character to produce the physics-guided motion data.

7. The method of claim 1, wherein the physics-based motion neural network model repeats the applying for multiple poses associated with the synthesized motion data.

8. The method of claim 1, wherein at least one of the steps of processing and applying is performed on a server or in a data center to generate synthesized motion, and the synthesized motion is streamed to a user device.

9. The method of claim 1, wherein at least one of the steps of processing and applying is performed within a cloud computing environment.

10. The method of claim 1, wherein at least one of the steps of processing and applying is performed on a virtual machine comprising a portion of a graphics processing unit.

11. A method, comprising:

processing, by a diffusion neural network model, an input motion definition and noisy motion data to produce synthesized motion data for a character for a diffusion timestep of multiple diffusion timesteps, wherein the synthesized motion data comprises joint positions and rotations for the character;

selectively disabling processing by a physics-based motion neural network model based on a mean motion of a denoising distribution and a noise level of the synthesized motion data;

converting the joint positions and rotations for the character into joint angles and velocities;

for each diffusion timestep that a physics-based motion neural network model is not disabled, applying learned parameters, by the physics-based motion neural network model, to adapt the synthesized motion data to physical constraints of an environment on the character;

converting adapted joint angles and velocities generated by the physics-based motion neural network model into the physics-guided motion data to produce physics-guided motion data that is specific to the character and physically plausible, wherein the physics-guided motion data corresponds to the input motion definition;

for each specific diffusion timestep that the physics-based motion neural network model is disabled, providing the synthesized motion data as the physics-guided motion data; and repeating the processing and applying for one or more remaining diffusion timesteps, wherein the physics-guided motion data replaces the noisy motion data for each iteration of the processing and applying.

12. A method, comprising:

processing, by a diffusion neural network model, an input motion definition and noisy motion data to produce synthesized motion data for a character for a diffusion timestep of multiple diffusion timesteps;

selectively disabling processing by a physics-based motion neural network model based on a mean motion of a denoising distribution and a noise level of the synthesized motion data;

for each diffusion timestep that a physics-based motion neural network model is not disabled, applying learned parameters, by the physics-based motion neural network model, to adapt the synthesized motion data to physical constraints of an environment on the character producing physics-guided motion data that is specific to the character and physically plausible, wherein the physics-guided motion data corresponds to the input motion definition and at least one of the steps of processing and applying is performed for training, testing, or certifying a neural network employed in a machine, robot, or autonomous vehicle;

for each specific diffusion timestep that the physics-based motion neural network model is disabled, providing the synthesized motion data as the physics-guided motion data; and repeating the processing and applying for one or more remaining diffusion timesteps, wherein the physics-guided motion data replaces the noisy motion data for each iteration of the processing and applying.

13. A system, comprising a processor configured to produce physics-guided motion data by:

processing, by a diffusion neural network model, an input motion definition and noisy motion data to produce synthesized motion data for a character for a diffusion timestep of multiple diffusion timesteps;

selectively disabling processing by a physics-based motion neural network model based on a mean motion of a denoising distribution and a noise level of the synthesized motion data, wherein the mean motion corresponds to physically-incorrect motion;

for each diffusion timestep that a physics-based motion neural network model is not disabled, applying learned parameters, by the physics-based motion neural network model, to adapt the synthesized motion data to physical constraints of an environment on the character producing the physics-guided motion data that is specific to the character and physically plausible, wherein the physics-guided motion data corresponds to the input motion definition;

for each specific diffusion timestep that the physics-based motion neural network model is disabled, providing the synthesized motion data as the physics-guided motion data; and repeating the processing and applying for one or more remaining diffusion timesteps, wherein the physics-guided motion data replaces the noisy motion data for each iteration of the processing and applying.

14. The system of claim 13, wherein the synthesized motion data encodes a motion artifact including at least one of floating above a ground surface, appendage sliding along the ground surface, and penetration of the ground surface.

15. The system of claim 14, wherein the physics-based motion neural network model removes the motion artifact from the synthesized motion data.

16. A non-transitory computer-readable media storing computer instructions for producing physics-guided motion data that, when executed by one or more processors, cause the one or more processors to perform the steps of:

processing, by a diffusion neural network model, an input motion definition and noisy motion data to produce synthesized motion data for a character for a diffusion timestep of multiple diffusion timesteps;

selectively disabling processing by a physics-based motion neural network model based on a mean motion of a denoising distribution and a noise level of the synthesized motion data, wherein the mean motion corresponds to physically-incorrect motion;

for each diffusion timestep that a physics-based motion neural network model is not disabled, applying learned parameters, by the physics-based motion neural network model, to adapt the synthesized motion data to physical constraints of an environment on the character producing the physics-guided motion data that is specific to the character and physically plausible, wherein the physics-guided motion data corresponds to the input motion definition;

for each specific diffusion timestep that the physics-based motion neural network model is disabled, providing the synthesized motion data as the physics-guided motion data; and repeating the processing and applying for one or more remaining diffusion timesteps, wherein the physics-guided motion data replaces the noisy motion data for each iteration of the processing and applying.

17. The non-transitory computer-readable media of claim 16, wherein the synthesized motion data encodes a motion artifact including at least one of floating above a ground surface, appendage sliding along the ground surface, and penetration of the ground surface.

18. The non-transitory computer-readable media of claim 17, wherein the physics-based motion neural network model removes the motion artifact from the synthesized motion data.

19. A method, comprising:

processing, by a diffusion neural network model, an input motion definition and noisy motion data to produce synthesized motion data for a character for a diffusion timestep of multiple diffusion timesteps;

selectively disabling processing by a physics-based motion neural network model based on a mean motion of a denoising distribution and a noise level of the synthesized motion data;

for each diffusion timestep that a physics-based motion neural network model is not disabled, applying learned parameters, by the physics-based motion neural network model, to adapt the synthesized motion data to physical constraints of an environment on the character producing physics-guided motion data that is specific to the character and physically plausible, wherein the physics-guided motion data corresponds to the input motion definition;

for each specific diffusion timestep that the physics-based motion neural network model is disabled, providing the synthesized motion data as the physics-guided motion data, wherein a number of the diffusion timesteps for which the physics-based motion neural network model is not disabled is specified and further comprising selectively disabling the physics-based motion neural network model based on the number; and repeating the processing and applying for one or more remaining diffusion timesteps, wherein the physics-guided motion data replaces the noisy motion data for each iteration of the processing and applying.

20. A method, comprising:

processing, by a diffusion neural network model, an input motion definition and noisy motion data to produce synthesized motion data for a character for a diffusion timestep of multiple diffusion timesteps;

selectively disabling processing by a physics-based motion neural network model based on a mean motion of a denoising distribution and a noise level of the synthesized motion data;

for each diffusion timestep that a physics-based motion neural network model is not disabled, applying learned parameters, by the physics-based motion neural network model, to adapt the synthesized motion data to physical constraints of an environment on the character producing physics-guided motion data that is specific to the character and physically plausible, wherein the physics-guided motion data corresponds to the input motion definition;

for each specific diffusion timestep that the physics-based motion neural network model is disabled, providing the synthesized motion data as the physics-guided motion data; and repeating the processing and applying for one or more remaining diffusion timesteps. wherein the physics-guided motion data replaces the noisy motion data for each iteration of the processing and applying and the physics-based motion neural network model is selectively disabled for at least one diffusion timestep in an early portion of the multiple diffusion timesteps.

* * * * *